United States Patent [19]

Heritage et al.

[11] Patent Number: 4,655,547
[45] Date of Patent: Apr. 7, 1987

[54] SHAPING OPTICAL PULSES BY AMPLITUDE AND PHASE MASKING

[75] Inventors: Jonathan P. Heritage, Red Bank; Andrew M. Weiner, Ocean Township, Monmouth County, both of N.J.

[73] Assignee: Bell Communications Research, Inc., Livingston, N.J.

[21] Appl. No.: 721,320

[22] Filed: Apr. 9, 1985

[51] Int. Cl.⁴ .......................... G02B 27/46; G02B 6/12
[52] U.S. Cl. .............................. 350/162.12; 350/96.11
[58] Field of Search .......................... 350/162.12, 96.11

[56] References Cited

PUBLICATIONS

*IEEE J. Quantum Electronics*, vol. QE-9, No. 2, Feb. 1973, pp. 213-217, "A New Approach to Picosecond Laser Pulse Analysis Shaping and Coding" by Jean Desbois, Francois Gires, and Pierre Tournois.
*Applied Physics Letters*, vol. 24, No. 4, Feb. 15, 1974, pp. 194-196, "Grating Filters for Thin-Film Optical Waveguides" by D. C. Flanders, H. Kogelnik, R. V. Schmidt and C. V. Shank.
*Applied Physics Letters*, vol. 24, No. 11, Jun. 1, 1974, pp. 547-549, "Two-Layered Construction of Integrated Optical Circuits and Formation of Thin-Film Prisms, Lenses, and Reflectors" by P. K. Tien, S. Riva-Sanseverino, R. J. Martin and G. Smolinsky.
*Applied Optics*, vol. 18, No. 14, Jul. 15, 1979, pp. 2500-2504 "Optical Pulse Shaping with a Grating Pair" by J. Agostinelli, G. Harvey, T. Stone and C. Gabel.
*Applied Physics Letters*, vol. 43(3), Aug. 1, 1983, pp. 228-230 "90-fs Tunable Optical Pulses Obtained by Two-Stage Pulse Compression" by B. Nikolaus and D. Grischkowsky.
*Applied Physics Letters*, vol. 44(8), Apr. 15, 1984, pp.729-731 "80x Single-Stage Compression of Frequency Doubled Nd:Yttrium Aluminum Garnet Laser Pulses" by A. M. Johnson, R. H. Stolen and W. M. Simpson.
*Optics Letters*, vol. 9, May 1984, pp. 150-152, "Negative Dispersion Using Pairs of Prisms" by R. L. Fork, O. E. Martinez and J. P. Gordon.
Proceedings of the Fourth International Conference, Ultrafast Phenomena IV, Monterey, Calif., Jun. 11-15, 1984, Editors: D. H. Auston and K. B. Eisenthal, published by Springer-Verlas, 1984, pp.7-10, "Solution Shaping Mechanisms in Passively Mode-Locked Lasers and Negative Group Velocity Dispersion Using Refraction" by O. E. Martinez, J. P. Gordon and R. L. Fork.

*Primary Examiner*—Bruce Y. Arnold
*Attorney, Agent, or Firm*—James W. Falk; Edward M. Fink

[57] ABSTRACT

Embodiments of the present invention control, manipulate and tailor the shape of input optical pulses to produce substantially transform-limited output pulses which can be shorter than the input pulses.

In embodiments of a first aspect of the present invention an input optical pulse is chirped, the chirped pulse is then passed through an optical component that spatially disperses the frequency components of the chirped pulse and partially compensates the chirp, the spatially dispersed frequency components are then passed through spatial amplitude and/or phase masks that control and/or adjust the amplitude and/or phase of the frequency components, and, finally, the masked components are passed through the first or a second optical component that returns the masked, spatially dispersed frequency components substantially to the spatial distribution of the input pulse while substantially completing the compensation of the chirp to form an output pulse.

21 Claims, 8 Drawing Figures

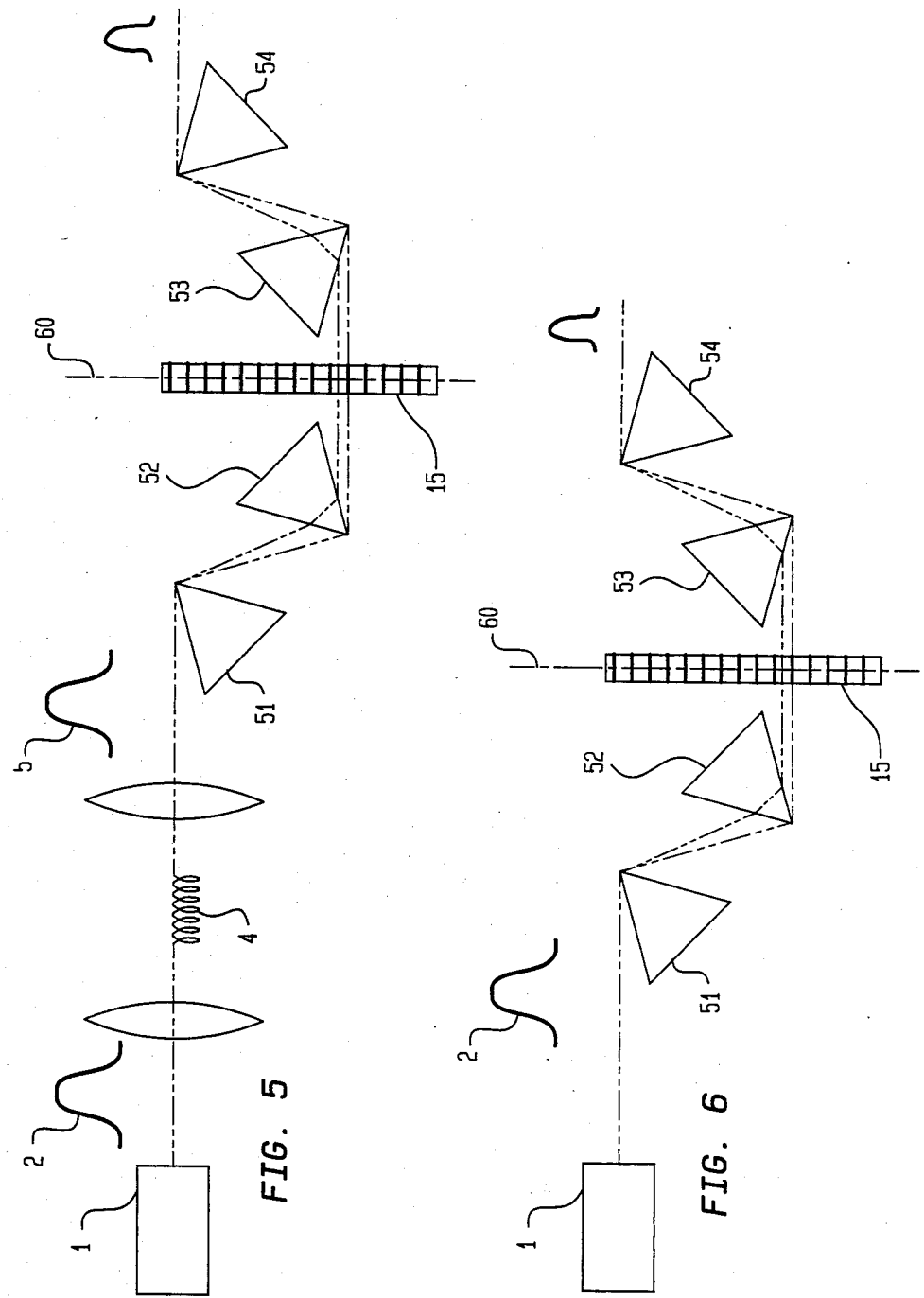

SHAPING OPTICAL PULSES BY AMPLITUDE AND PHASE MASKING

BACKGROUND OF THE INVENTION

The present invention pertains to apparatus for controlling, manipulating and tailoring the shape of optical pulses.

An optical pulse shaping system capable of producing output pulses of a desired temporal and spectral profile has application in areas such as optical digital communications, quantum optics and laser fusion. For example, laser fusion experiments require the production of optical pulses on the picosecond to nanosecond time scale with properly shaped temporal intensity profiles. High speed optical communications systems also require pulse shaping, forming and coding.

Several approaches to pulse shaping have been proposed in the prior art and these generally use either active or passive shaping techniques. Active pulse shaping techniques include electrooptic deflectors and Pockels cells. Passive pulse-shaping techniques include mirror stackers, etalon stackers, intensity dependent filters, flat lens shapers, nonlinear interferometers, birefringent filters and double-grating pulse shaping systems.

In particular, an article entitled "Optical Pulse Shaping With a Grating Pair" by J. Agostinelli, G. Harvey, T. Stone and C. Gabel in *Applied Optics*, Vol. 18, No. 14, 15 July 1979, pp. 2500-2504 discloses the concept of a passive pulse-shaping system that uses a pair of diffraction gratings along with various filters of amplitude and/or phase type to alter the temporal and/or instantaneous spectral profile of the input pulse. Amplitude filters will attenuate certain spectral components and therefore certain portions of the temporal profile of the input pulse will be attenuated. Phase filters will shift various groups of spectral components in time.

As shown in the article, an unshaped input pulse enters the system by impinging upon a first diffraction grating. The diffracted beam emerges as a diverging fan of rays due to the bandwidth of the input pulse and the dispersive nature of the grating. The diverging beam then impinges upon a second diffraction grating of identical groove spacing as the first grating. The angles of the two gratings are precisely matched, so that after the second diffraction, the rays emerge parallel to the input ray direction. A mirror is set perpendicular to the beam emerging from the second grating in order to reflect light back through the pair of diffraction gratings, with each ray retracing its steps, so that a collimated beam emerges at the output of the system in the opposite direction of the incident beam.

Each spectral component of the input pulse traverses a different distance in passage through this system. However, due to the negatively dispersive nature of the grating pair, higher frequency components of the input pulse emerge prior to the lower frequency components.

In the plane of the mirror, called the filter plane, there is both spatial and temporal transposition of the spectral components of the input pulse. Amplitude filters are inserted in the "filter plane" to attenuate certain spectral components and therefore attenuate certain portions of the temporal profile of the output pulse. Phase filters are inserted to shift various groups of spectral components in time.

Further, the article discloses the use of various opaque strips placed at various places in the "filter plane" to alter the shape of the output pulse and the use of a plate having a continuously varying transmission function to produce a linearly ramped output pulse.

Unfortunately, the output pulse from the system shown in the article is linearly frequency modulated, "as predicted by linear systems theory (the Fresnel transform of a band-limited Gaussian is a wider Gaussian with linear FM)". Furthermore, the output pulse is not transform-limited, i.e., the output pulse has more spectral width than is necessary to support the features of the shape of the intensity profile, and it is necessarily longer than the input pulse. Since a transform-limited pulse will propagate a greater distance in an optical fiber than a non-transform-limited pulse before being distorted by dispersion of the group velocity, this presents a substantial drawback in using output pulses from the system disclosed in the article in optical digital communications systems.

SUMMARY OF THE INVENTION

The present invention solves the above-stated problems by controlling, manipulating and tailoring the shape of input optical pulses to produce unchirped, transform-limited output pulses which can be shorter than the input pulses.

In embodiments of a first aspect of the present invention, an input optical pulse is chirped, the chirped pulse is then passed through an optical component that spatially disperses the frequency components of the chirped pulse and partially compensates the chirp, the spatially dispersed frequency components are then passed through spatial amplitude and/or phase masks that control and/or adjust the amplitude and/or phase of the frequency components, and, finally, the masked components are passed through the first or a second optical component that returns the masked, spatially dispersed frequency components substantially to the spatial distribution of the input pulse while substantially completing the compensation of the chirp to form an output pulse.

It should be clear to those skilled in the art that use of the term optical component herein refers to components of any sort that operate on optical pulses.

We describe embodiments of the present invention wherein the means for chirping the input optical wave provide a substantially linearly chirped pulse. The output pulse is substantially transform-limited when the apparatus constructed according to the present invention compensates the substantially linear chirp.

The means for substantially linearly chirping the input pulse, in one embodiment, is an optical fiber in which the chirp is produced by a nonlinear interaction, e.g. self-phase modulation (SPM), between the fiber and the input light pulse. In this embodiment, the output pulses can be shorter than the input pulses because the nonlinear interaction has increased the spectrum of the input pulses.

The means for substantially linearly chirping the input pulse, in another embodiment, is an optical fiber in which the chirp is produced by a linear interaction, e.g. group velocity dispersion (GVD). In this embodiment, the output pulses can only be as short as the input pulses because no spectrum has been added to the input pulse.

In order that the spatially dispersed frequency components are substantially brought together in space, both transverse to and along the propagation direction of the output pulse, the time dispersion of the optical components must be of the correct sign, amplitude and shape. This can be achieved in many forms. An optical component may comprise a pair of diffraction gratings, a diffraction grating with two mirrors, a pair of prisms, or a prism with two mirrors and so forth. For example, an appropriate arrangement of a pair of prisms is shown in an article entitled "Negative Dispersion Using Pairs of Prisms" by R. L. Fork, O. E. Martinez and J. P. Gordon in *Optics Letters*, Vol. 9, May 1984, pp. 150–152 (hereinafter referred to as the Fork et al. article).

Embodiments using diffraction gratings require the input pulse to be positively chirped because diffraction gratings have negative dispersion, whereas embodiments using prisms may operate on either positively or negatively chirped pulses (a positive chirp is taken to mean that as you observe a pulse in time, you get to higher frequency components as time advances, i.e., blue comes later in the pulse in time than red).

Embodiments using diffraction gratings or prisms in the optical components can be fabricated in integrated optics systems. For example, integrated prisms are shown in an article entitled "Two-Layered Construction of Integrated Optical Circuits and Formation of Thin-Film Prisms, Lenses, and Reflectors" by P. K. Tien, S. Riva-Sanseverino, R. J. Martin, and G. Smolinsky in *Applied Physics Letters*, Vol. 24, No. 11, 1 June 1974, pp. 547–549 (hereinafter referred to as the Tien et al. article).

Embodiments of another aspect of the present invention have the advantage of not needing to chirp the input optical pulse. Here, the input optical pulse is passed through an optical component, having substantially zero dispersion, which spatially disperses the frequency components of the input pulse, the spatially dispersed frequency components are then passed through spatial amplitude and/or phase masks that control and/or adjust the amplitude and/or phase of the frequency components, and, finally, the masked components are passed through the first or a second optical component, having substantially zero dispersion, which returns the masked, spatially dispersed frequency components substantially to the spatial distribution of the input pulse to form an output pulse.

Examples of an optical component that has substantially zero dispersion is a pair of prisms or a prism with a pair of mirrors, as discussed in more detail hereinbelow.

Further embodiments, similar to the above-described embodiments, which also have the advantage of not needing to chirp the input optical pulses, utilize two optical components having dispersions with substantially equal magnitudes but opposite signs.

In an embodiment of a still further aspect of the present invention, suitably chirped pulses are provided as the output from a laser, for example, from various modelocked lasers such as modelocked dye lasers and various semiconductor injection lasers. These chirped pulses are then directed to optical components in the manner described hereinabove.

BRIEF DESCRIPTION OF THE DRAWINGS

A complete understanding of the present invention may be gained by considering the following detailed description in conjunction with the accompanying drawings, in which:

FIG. 5 shows, in pictorial form, an embodiment of the present invention in which a first pair of prisms spatially disperse the frequency components of a chirped optical pulse and a second pair of prisms recombine the frequency components after they have passed through an amplitude and/or phase mask; and FIG. 6 shows, in pictorial form, an embodiment of the present invention in which a first pair of prisms spatially disperse the frequency components of an input optical pulse and a second pair of prisms recombine the frequency components after they have passed through an amplitude and/or phase mask.

To facilitate reader understanding, identical reference numerals are used to designate elements common to the figures.

DETAILED DESCRIPTION

Figure 1:
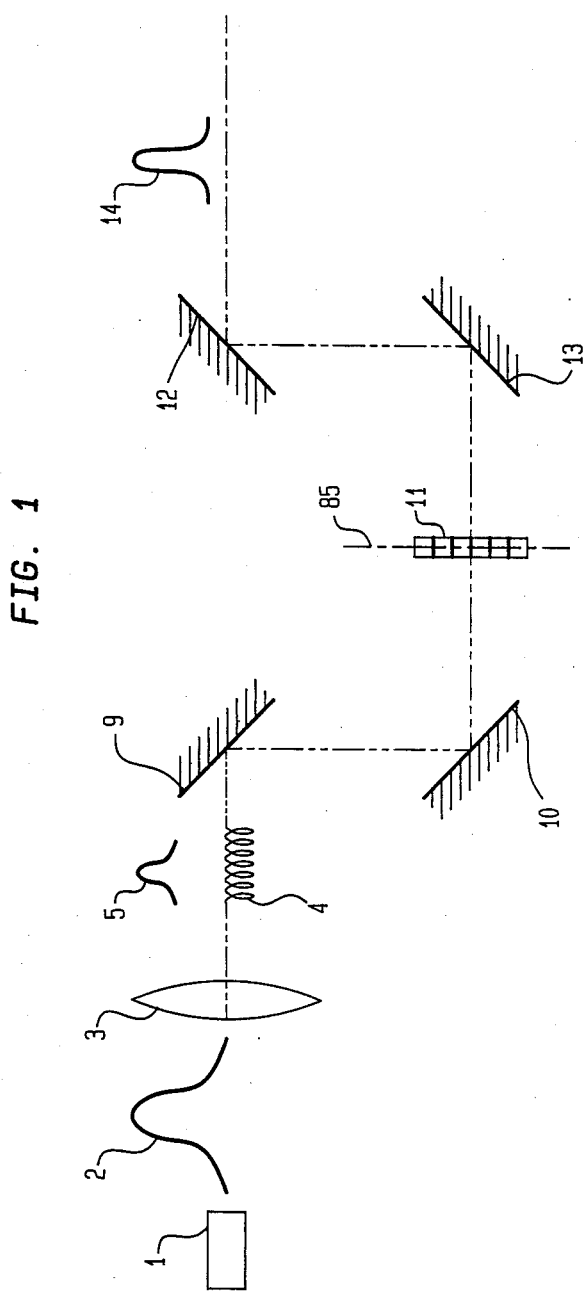
FIG. 1 shows, in pictorial form, an embodiment of the present invention in which a first pair of diffraction gratings spatially disperse the frequency components of a chirped optical pulse and a second pair of diffraction gratings recombine the frequency components after they have passed through an amplitude and/or phase mask.

FIG. 1 shows an embodiment of one aspect of the present invention which comprises means for substantially linearly chirping an input optical pulse, a first optical component that spatially disperses the frequency components of the chirped pulse at a plane in the system and partially compensates the chirp, spatial amplitude and/or phase masks disposed to control and/or adjust the amplitude and/or phase of the spatially dispersed frequency components, and a second optical component that returns the frequency components substantially to the spatial distribution of the input pulse and substantially completes the compensation of the chirp. The resulting output pulse is substantially transform-limited since the optical system shown in FIG. 1 compensates the substantially linear chirp.

In FIG. 1, input pulse 2 is generated by laser 1. This pulse is launched into single-mode fiber 4 where chirped pulse 5 is produced by a nonlinear self-phase modulation interaction. Chirped pulse 5 impinges upon diffraction grating pair 9 and 10 which spatially disperses the spectral components of pulse 5 over the plane indicated by dotted line 85. Mask 11, a spatial amplitude and/or phase mask, is positioned at plane 85 to intercept the spatially dispersed spectral components. After passage through mask 11, the spectral components impinge upon diffraction grating pair 12 and 13, which returns the frequency components substantially to the spatial distribution of input pulse 2. Grating pair 9 and 10 partially compensates for the chirp introduced by optical fiber 4 and grating pair 12 and 13 completes the chirp compensation.

Figure 2:
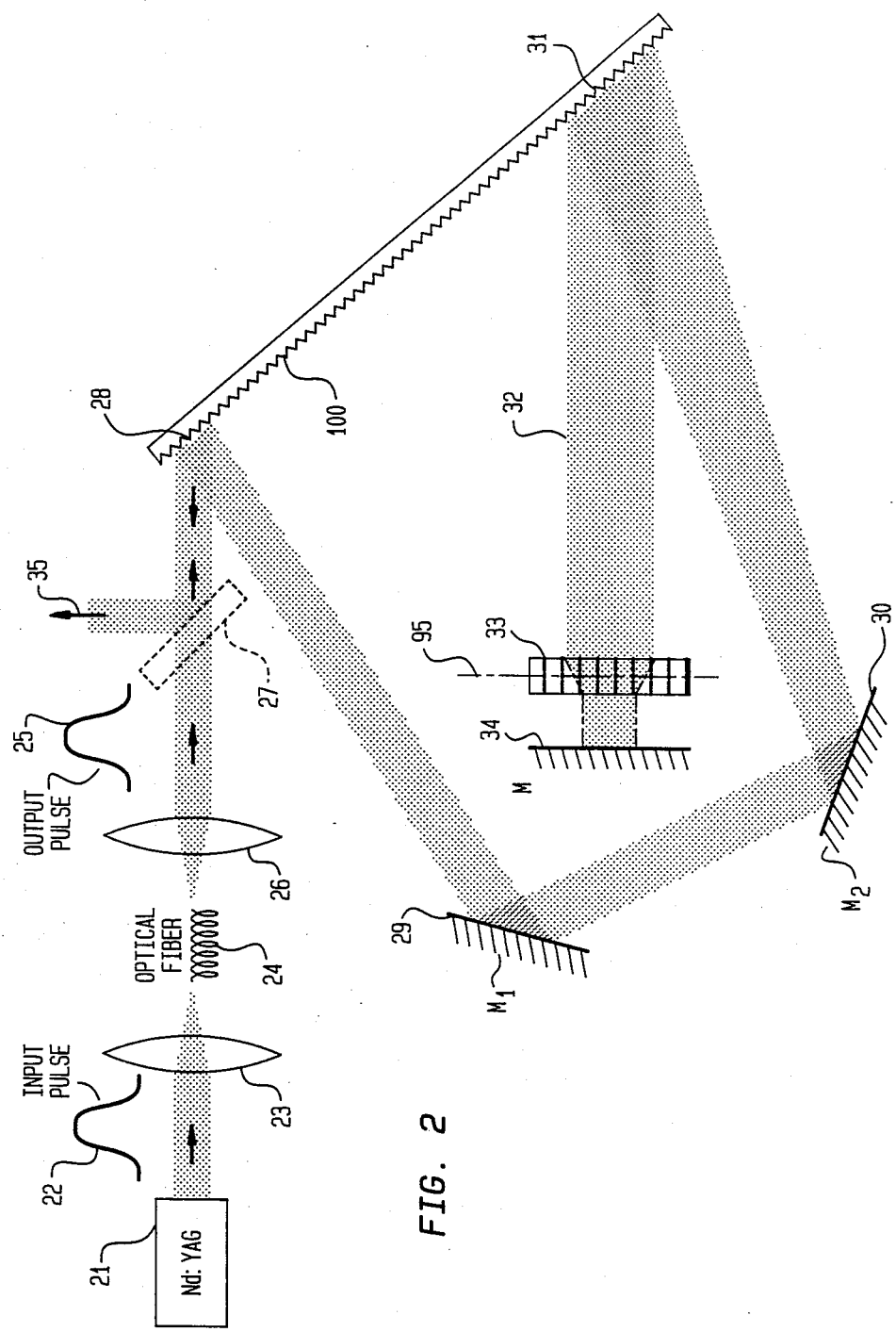
FIG. 2 shows, in pictorial form, an embodiment of the present invention in which two parts of a single diffraction grating are used, along with an arrangement of mirrors, to provide both spatial dispersion and recombination of the frequency components of a chirped optical pulse.

FIG. 2 shows another embodiment we have constructed using a single diffraction grating and three mirrors. Modelocked pulse train 22 was generated by CW Nd:YAG laser 21 operating at the fundamental period with second harmonic modelocking. Pulses 22 were 80 psec in duration with a peak power of approximately 60 watts and a repetition period of 10 nsec. These pulses were launched through lens system 23 into silicon core, 7.3 micron diameter single-mode, polarization-preserving fiber 24, having an index of refraction difference between the core and the cladding of 0.0054, and 2 db/km loss. Fiber 24 was approximately 400 meters in length. The cladding structure of fiber 24 was designed to suppress higher order modes. The action of the nonlinear refractive index and the intensity profile of pulse 22 produced chirped pulse 25. The spectrum of chirped pulse 25 was broadened by a factor as much as 100 times the spectrum of input pulse 22. Chirped pulse 25 was then collected from the output end of fiber 24 and telescoped to a diameter of several millimeters by lens system 26. This telescoped beam then impinged on section 28 of diffraction grating 100, which diffraction grating was oriented near Litrow configuration. The diffracted beam then bounced off mirrors 29 and 30 and onto section 31 of diffraction grating 100. The frequency components of chirped pulses 25 were spatially separated and travelled parallel to each other in beam 32. Mask 33 was inserted into beam 32 at plane 95 to provide the temporal shaping for the output pulses. Turn-around mirror 34 was placed in the path of beam 32, after mask 33, so that, after reflection, the remnants of beam 32 would retrace their path through sections 28 and 31 of diffraction grating 100 and impinge upon beam splitter 27. Tailored output pulses 35 were recovered from beam splitter 27. Output pulses 35 may be slightly displaced out of the plane of FIG. 2 for convenient separation by tilting mirrors 29 and 30. Alternatively, beam splitter 27 may be omitted if turn-around mirror 34 is tilted slightly.

Figure 3:
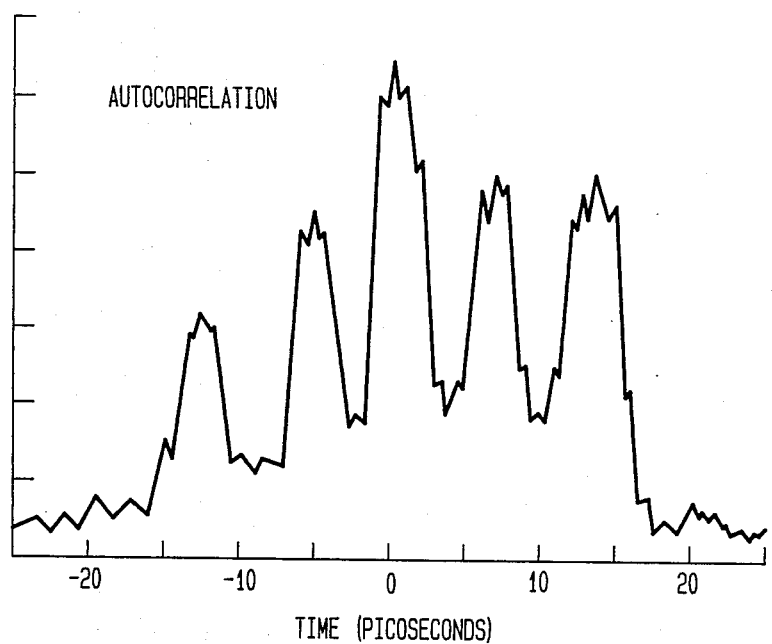
FIG. 3 shows, in graphical form, the autocorrelation trace of a reshaped, compressed pulse formed by spatially modulating the spectral amplitude of a chirped pulse with a periodic spatial mask in the embodiment shown in FIG. 2.

We have produced various shaped output pulses from the embodiment shown in FIG. 2 by using periodic amplitude masks fabricated from a series of wires as well as phase masks formed from a 3 micron thick pellicle. FIG. 3 shows the autocorrelation trace of a burst of three major pulses formed by an amplitude mask which consisted of six opaque strips spaced within the spectrally dispersed region of plane 95. This demonstrates the result that periodic modulation of the spectral amplitude produces a burst of several equally-spaced pulses.

Figure 4:
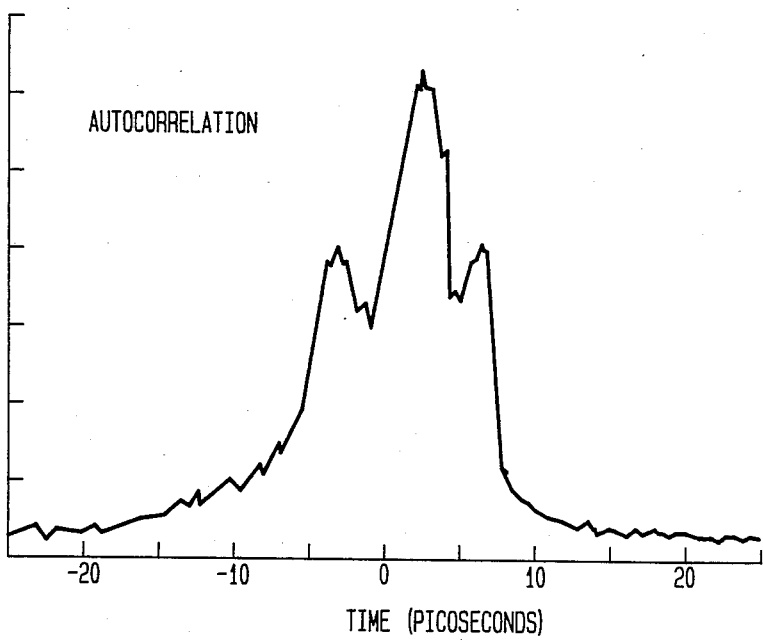
FIG. 4 shows, in graphical form, the autocorrelation trace of a reshaped, compressed pulse formed by phase shifting one half of the spectral amplitude of a chirped pulse by approximately Pi radians in the embodiment shown in FIG. 2.

FIG. 4 displays the autocorrelation obtained by introducing a net constant phase shift of Pi radians in the higher frequency half of the frequency spectrum. This phase shift was produced by inserting a tilted pellicle of approximately 3 microns thickness into the spatial region at plane 95 corresponding to the higher frequency half of the spectrum. As the tilt angle of the pellicle was varied, the relative phase shift could be varied between 0 and Pi radians. As a result, the autocorrelation varied smoothly between a single picosecond pulse and the triply peaked autocorrelation trace shown in FIG. 4. This trace is characteristic of a double pulse structure which is expected for a pulse whose spectral components suffer a, change of Pi at the halfway point.

Because the temporal shape of a pulse is related to the frequency spectrum by a Fourier transform, control of the various frequency components allows manipulation of the temporal pulse shape itself, i.e., filtering in the frequency domain allows manipulation of temporal pulse shape. We accomplish the frequency domain manipulation by adjusting the amplitude and/or phase of the frequency components after they have been spatially dispersed.

Many further embodiments of spatial amplitude masks may be fabricated from patterned opaque, partially transmitting, or reflecting films. Many further embodiments of phase masks may be fabricated from patterned transparent or partially transparent dielectric media. Furthermore, masks can be fabricated which comprise combinations of spatial and amplitude masks. In addition, for ease of fabrication, masks can be formed directly on the turn-around mirror, if one is used.

An advantage of using a nonlinear interaction to produce the chirp, as has been described hereinabove with regard to FIGS. 1 and 2, is that the frequency spectrum of the input pulse is enlarged and the resulting output pulses can be compressed. This compression phenomenon is shown in an article entitled "80x Single-Stage Compression of Frequency Doubled Nd:Yttrium Aluminum Garnet Laser Pulses" by A. M. Johnson, R. H. Stolen, and W. M. Simpson in *Applied Physics Letters*, 44(8), 15 April 1984, pp. 729-731. This article states at p. 729: "The technique of optical pulse compression utilizing self-phase modulation (SPM) to chirp the pulse in a single-mode fiber followed by a grating-pair dispersive delay line has been very successful in compressing dye laser pulses."

However, self-phase modulation in single-mode fibers in the absence of group velocity dispersion produces a frequency sweep (chirp) across the pulse that is linear only in the center of the pulse. Since a grating pair is a matched filter for a linear frequency sweep, parts of a pulse with a nonlinear chirp remain in the output pulse. This situation is not as severe in fibers with group velocity dispersion because the GVD tends to linearize the chirp over more of the pulse. For a particular input pulse length, peak power, wavelength, and fiber core area, a maximally linear chirp occurs, however, for only one fiber length. This optimal length varies as $t_0^2/\sqrt{P}$ where $t_0$ and P are the input pulsewidth and peak power. For input pulsewidths in the range between 100 fsec and 100 psec and a 600 nm wavelength, optimal fiber lengths are between about 1 cm and 10 km. Since GVD decreases as the wavelength approaches the dispersion minimum of fibers near 1.3 microns, optimal lengths can become even longer.

Although the input pulses may be chirped by means of an active interaction, embodiments of the present invention also operate on pulses that have been passively chirped, such as by passive GVD in optical fibers or by dispersion in integrated optic waveguides or by bulk dispersive material waveguides and so forth. When passive chirping is used, however, no new frequency components are added to the input pulses, and the output pulses cannot be shorter than the input.

In the embodiments shown in FIGS. 1 and 2, the optical components utilize diffraction gratings and therefore have a negative dispersion. Such embodiments require positively chirped pulses in order to produce unchirped output pulses. In the visible region of the spectrum most glasses and other transparent media have positive group velocity dispersion.

FIG. 5 shows a further embodiment of the present invention which is similar to that shown in FIG. 1. Here prism pairs 51,52 and 53,54 provide the spatial dispersion of the frequency components and chirp compensation whicIG. 1. Here prism pairs 51,52 and 53,54 provide the spatial dispersion of the frequency components which is provided by grating pairs 9,10 and 12,13 of FIG. 1. The pairs of diffraction gratings shown in FIG. 1 have negative dispersion and ded by grating pairs 9,10 and 12,13 of FIG. 1. The pairs of diffraction gratings shown in FIG. 1 have negative dispersion and can, in certain instances, introduce relatively large losses in the system. In contrast, prism pairs have a group-velocity dispersion whose values are adjustable from negative to positive values and can provide low loss. (We also note that the group-velocity dispersion can also have a zero value, which feature is used in a further aspect of the present invention as described hereinbelow in connection with FIG. 6). In addition, the use of pairs of prisms provides a transmitted beam which is collinear with the incident beam.

Although a number of prism arrangements can be devised, the arrangement shown in the Fork et al. article is useful. As described therein, four identical prisms are used at minimum deviation and Brewster's angle incidence at each surface. Each pair is arranged antiparallel so that the second one undoes the ray bending of the first. The loss is minimized by operation such that the rays of interest pass through all of the prism faces approximately at Brewster's angle. This requires that tan (a)=1/n, where 2a is the apex angle of the prisms and n is the index of refraction of the prism material; and that tan (e)=n, where e is the external angle of incidence of the beam on the prism faces. Collimated rays of different frequencies incident on a prism pair emerge displaced laterally, but all parallel to one another.

In FIG. 5, the entrance face of prism 52 is parallel to the exit face of prism 51, the exit face of prism 52 is parallel to the entrance of prism 51 and so forth. All the prisms have been cut so that the angle of minimum deviation is also Brewster's angle. The plane denoted by dotted line 60 is normal to the rays between prisms 52 and 53 and midway between the two prisms. It is a plane of symmetry and the plane at which amplitude and/or phase masks 15 are placed.

This prism arrangement has two components of group-velocity dispersion. The first results from the length of prism material traversed by the light beams. In the visible region of the spectrum most glasses and other transparent media have positive group velocity dispersion. The second, which is negative, is proportional to the first derivative squared of the refractive index and to the distance between the apexes of the prisms. The translation of any one of the prisms along an axis normal to its base introduces a positive dispersion of variable magnitude into the system without altering the ray directions or the negative dispersion that is due to the geometry of the ray paths. Therefore, the pairs of prisms shown in FIG. 5 can be arranged to have a positive, negative or zero dispersion. In the case where the prisms are arranged to have negative dispersion, the chirp produced on the input wave would have to be positive. In the case where the prisms are arranged to have positive dispersion, the chirp produced on the input wave would have to be negative.

An embodiment similar to that shown in FIG. 2, but not shown, using one or two prisms can be obtained by placing a turn-around mirror behind mask 15 at symmetry plane 60. In this case, the output beam will be collinear with the incident beam but oppositely directed. Beam separation can be achieved, for example, by offsetting the return beam in the direction normal to the plane of the figure before retro-reflection.

In an embodiment of a further aspect of the present invention, shown in FIG. 6, unchirped input pulse 2, output from laser 1, is directed into prism pair 51,52 having zero dispersion. (The manner of achieving zero dispersion has been described hereinabove.) The rest of this embodiment operates in a similar manner with the operation of the embodiment shown in FIG. 5 and described hereinabove. It should be clear to those skilled in the art that operation with an unchirped input pulse may also be achieved by using a first pair of prisms having a positive dispersion which is equal in magnitude to the negative dispersion of a second pair of prisms.

Figures 7, 8:
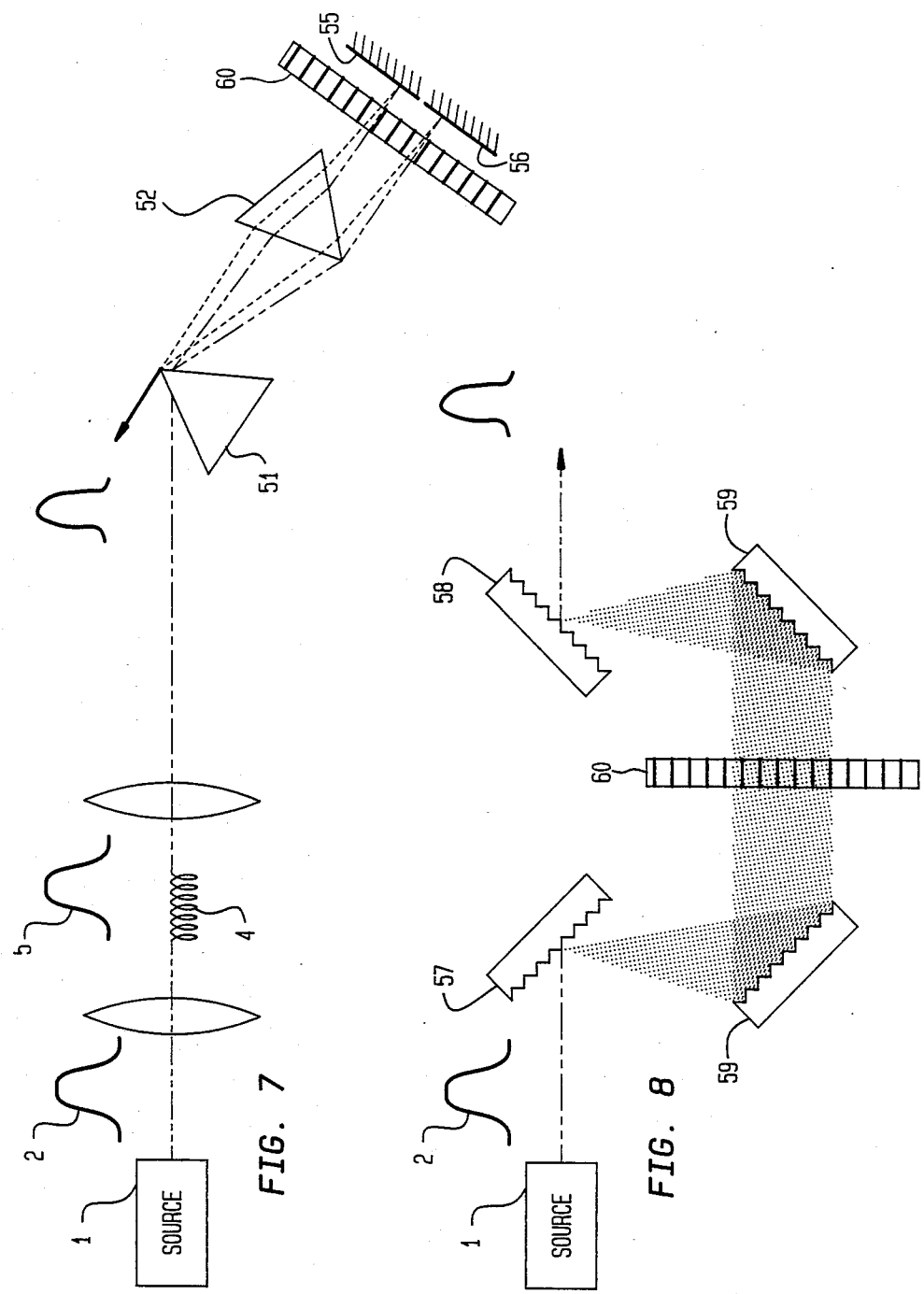
FIG. 7 shows, in pictorial form, an embodiment of the present invention in which a pair of prisms spatially disperse the frequency components of a chirped optical pulse and a pair of mirrors recombine the frequency components after they have passed through an amplitude and/or phase mask.
FIG. 8 shows, in pictorial form, an embodiment of the present invention in which a first pair of diffraction gratings disperse the frequency components of an input optical pulse, and a second pair of diffraction gratings recombine the frequency components after they have passed through an amplitude and/or phase mask.

A further embodiment of the present invnetion, shown in FIG. 7, which operates in a manner similar to the embodiment shown in FIG. 5 can be fabricated by using a simple pair of prisms and a pair of mirrors 55 and 56.

Another embodiment of the present invention, shown in FIG. 8, which operates in a manner similar to the embodiment shown in FIG. 6 can be fabricated by using a first pair of diffraction gratings 57 and 58 as the first optical component and a second pair of diffraction gratings 59 and 60 as the second optical component.

A further embodiment of the present invention can be fabricated by using a single pair of prisms, having substantially zero dispersion, and a turn-around mirror. This operates in a similar manner to the embodiment shown in FIG. 2.

The embodiments which use prisms are especially suited to the femtosecond regime where large bandwidths require lesser amounts of dispersion.

Further advantageous embodiments of the present invention can be fabricated using integrated optical circuits. For example, the fabrication of integrated optical prisms is disclosed in the Tien et al. article and the fabrication of integrated diffraction gratings is disclosed in an article entitled "Grating Filters For Thin-Film Optical Waveguides" by D. C. Flanders, H. Kogelnik, R. V. Schmidt and C. V. Shank in *Applied Physics Letters*, Vol. 24, No. 4, 15 Feb. 1974, pp. 194–196. In such integrated optics embodiments, phase and ampl , Vol. 24, No. 4, 15 Feb. 1974, pp. 194–196. In such integrated optics embodiments, phase and amplitude masking may be introduced into the beam by structures having fixed masks or by structures providing time variable masks using electrooptic, acoustooptic or nonlinear optical means. For example, masks may be fabricated within or adjacent to a waveguide where evanescent fields may be influenced by loss mechanisms or by refractive index, i.e., phase, changes. In further examples, the electrooptic effect in $LiNbO_3$ or GaAs may be used to control phase by first depositing electrodes on such waveguides and then applying an appropriately patterned electric field. These embodiments provide the ability to alter the amplitude and/or phase masks as a function of time and thereby imposing a coding signal onto the output pulses for use in an optical communications system. Fixed masks can find use in optical communications systems, for example, to regenerate signals.

In embodiments, not shown, of a still further aspect of the present invention, chirped pulses, output from a source, are passed through an optical component that spatially disperses the frequency components and partially compensates the chirp, the spatially dispersed frequency components are then passed through spatial amplitude and/or phase masks that control and/or adjust the amplitude and/or phase of the frequency components, and, finally, the asked components are passed through the first or a second optical component that returns the masked, spatially dispersed frequency components substantially to the spatial distribution of the chirped pulse, while substantially completing the compensation of the chirp, to form an output pulse. The source of such chirped pulses are various modelocked lasers such as modelocked dye lasers or various semiconductor injection lasers.

It should also be clear to those skilled in the art that further embodiments of the present invention may be made by those skilled in the art without departing from the teachings of the present invention.

What is claimed is:

1. A pulse shaper to produce an output pulse from an input optical pulse which comprises:
   chirping means for chirping the input optical pulse,
   a first optical component that spatially disperses the frequency components of the chirped pulse and partially compensates the chirp,
   a spatial amplitude and/or phase mask disposed to control and/or adjust the amplitude and/or phase of the spatially dispersed frequency components, and
   a second optical component that returns the masked frequency components substantially to the spatial distribution of the input optical pulse and substantially completes the compensation of the chirp to form the output pulse.

2. The pulse shaper claimed in accordance with claim 1 wherein the chirping means comprises a nonlinear means for increasing the frequency spectrum of the input optical pulse.

3. The pulse shaper claimed in accordance with claim 2 wherein the chirping means comprises an optical fiber having a non-linear self-phase modulation interaction mechanism.

4. The pulse shaper claimed in accordance with claim 1 wherein one of the optical components comprises a pair of diffraction gratings.

5. The pulse shaper claimed in accordance with claim 1 wherein one of the optical components comprises a diffraction grating and two mirrors.

6. The pulse shaper claimed in accordance with claim 1 wherein one of the optical components comprises a pair of prisms.

7. The pulse shaper claimed in accordance with claim 1 wherein one of the optical components comprises a prism and two mirrors.

8. The pulse shaper claimed in accordance with claim 1 wherein the chirping means comprises a fiber having a linear group-velocity dispersion.

9. The pulse shaper claimed in accordance with claim 1 wherein the amplitude mask comprises a patterned opaque, partially transmitting or reflecting film.

10. The pulse shaper claimed in accordance with claim 1 wherein the phase mask comprises a patterned transparent or partially transparent dielectric film.

11. A source of optical output pulses which comprises:
    source means for providing a chirped optical pulse,
    a first optical component that spatially disperses the frequency components of the chirped pulse and partially compensates the chirp,
    a spatial amplitude and/or phase mask disposed to control and/or adjust the amplitude and/or phase of the spatially dispersed frequency components, and
    a second optical component disposed to redirect the masked frequency components back into the first optical component, whereby the masked spatially dispersed frequency components are returned substantially to the spatial distribution of the input optical pulse to form the output pulse.

12. The pulse shaper claimed in accordance with claim 11 wherein the second optical component is a mirror.

13. The pulse shaper claimed in accordance with claim 12 wherein the first optical component comprises a prism and two mirrors.

14. The pulse shaper claimed in accordance with claim 11 wherein the first optical component comprises a pair of diffraction gratings.

15. The pulse shaper claimed in accordance with claim 11 wherein the first optical component comprises a pair of prisms.

16. The pulse shaper claimed in accordance with claim 11 wherein the first optical component comprises a diffraction grating and two mirrors.

17. A pulse shaper to produce an output pulse from an input optical pulse which comprises:
    a first optical component having a substantially zero group velocity dispersion that spatially disperses the frequency components of the input optical pulse,
    a spatial amplitude and/or phase mask disposed to control and/or adjust the amplitude and/or phase of the spatially dispersed frequency components, and
    a second optical component having a substantially zero group velocity dispersion that returns the masked frequency components substantially to the spatial distribution of the input oroup velocity dispersion that returns the masked frequency components substantially to the spatial distribution of the input optical pulse to form the output pulse.

18. The pulse shaper claimed in accordance with claim 17 wherein the first and second optical components each comprise a pair of prisms.

19. A pulse shaper to produce an output pulse from an input optical pulse which comprises:
    a first optical component having a substantially zero group velocity dispersion that spatially disperses the frequency components of the input pulse,
    a spatial amplitude and/or phase mask disposed to control and/or adjust the amplitude and/or phase of the spatially dispersed frequency components, and
    a second optical component disposed to redirect the masked frequency components back into the first optical component, whereby the masked spatially dispersed frequency components are returned substantially to the spatial distribution of the input optical pulse to form the output pulse.

20. A pulse shaper to produce an output pulse from an input optical pulse which comprises:
- a first optical component having a group velocity dispersion of a first sign and first magnitude that spatially disperses the frequency components of the input optical pulse,
- a spatial amplitude and/or phase mask disposed to control and/or adjust the amplitude and/or phase of the spatially dispersed frequency components, and
- a second optical component having a group velocity dispersion with opposite sign to the first sign and a magnitude substantially equal to the first magnitude that returns the masked frequency components substantially to the spatial distribution of the input optical pulse to form the output pulse.

21. A source of an optical output pulse which comprises:
- source means for providing a chirped optical pulse,
- a first optical component that spatially disperses the frequency components of the chirped pulse and partially compensates the chirp,
- a spatial amplitude and/or phase mask disposed to control and/or adjust the amplitude and/or phase of the spatially dispersed frequency components, and
- a second optical component that returns the masked frequency components substantially to the spatial distribution of chirped optical pulse and substantially completes the compensation of the chirp to form the output pulses.

* * * * *

UNITED STATES PATENT AND TRADEMARK OFFICE
CERTIFICATE OF CORRECTION

PATENT NO. : 4,655,547

DATED : April 7, 1987

INVENTOR(S) : J. P. Heritage and A. M. Weiner

It is certified that error appears in the above-identified patent and that said Letters Patent is hereby corrected as shown below:

```
Column 6, line 8, after "a" remove comma.
Column 7, line 11-14, delete --Here prism ... whichIG. 1.--.
Column 7, line17-19, delete --The pairs of ... FIG. 1.--.
Column 8, line 28, change "invnetion" to --invention--.
Column 8, line 55-57, delete --In such ... pp. 194-196--.
Column 10, line 51-54, delete --oroup velocity ... of the input--.
```

Signed and Sealed this

Thirty-first Day of July, 1990

Attest:

HARRY F. MANBECK, JR.

Attesting Officer

Commissioner of Patents and Trademarks